(12) United States Patent
Takanashi

(10) Patent No.: US 7,940,323 B2
(45) Date of Patent: May 10, 2011

(54) IMAGE-PICKUP APPARATUS AND CONTROL METHOD THEREOF

(75) Inventor: Hideya Takanashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 12/184,868

(22) Filed: Aug. 1, 2008

(65) Prior Publication Data

US 2009/0040354 A1    Feb. 12, 2009

(30) Foreign Application Priority Data

Aug. 9, 2007    (JP) .................................. 2007-207398

(51) Int. Cl.
G03B 13/00    (2006.01)
(52) U.S. Cl. ........ 348/345; 348/349; 348/353; 348/354; 348/355; 348/356
(58) Field of Classification Search .................. 348/345, 348/349, 353, 354, 355, 356; 396/79, 80
See application file for complete search history.

(56) References Cited

U.S. PATENT DOCUMENTS

| 6,201,932 B1* | 3/2001 | Tsujimoto ...................... 396/225 |
| 2004/0090550 A1* | 5/2004 | Park .............................. 348/350 |
| 2005/0128340 A1* | 6/2005 | Ikeda ............................ 348/345 |
| 2005/0212950 A1* | 9/2005 | Kanai ........................... 348/345 |
| 2006/0028577 A1* | 2/2006 | Honjo et al. ................... 348/345 |
| 2007/0030381 A1* | 2/2007 | Maeda ........................... 348/345 |
| 2009/0135292 A1* | 5/2009 | Muramatsu .................... 348/349 |

FOREIGN PATENT DOCUMENTS

| JP | 09-211522 | 8/1997 |
| JP | 2000-275512 | 10/2000 |

* cited by examiner

Primary Examiner — Sinh Tran
Assistant Examiner — Selam Gebriel
(74) Attorney, Agent, or Firm — Cowan, Liebowitz & Latman, P.C.

(57) ABSTRACT

An image-pickup apparatus 100 includes a focus detecting part 7 that detects focus information indicating a focus state of an image-pickup optical system, a color measuring part 14a, 14b, and 15 that detects color measurement information related to a color of an object, a controlling part 6 that generates controlling information used in focus control using the focus information and the color measurement information, and a memory 9 that stores the color measurement information. When the color measurement information stored in the memory 9 is referred to as a first color measurement information, and color measurement information which is detected by the color measuring part after the first color measurement information is detected is referred to as a second color measurement information, the controlling part performs a determination related to a delay in the acquisition of the second color measurement information relative to the acquisition of the focus information, and, based on the determination result, switches the color measurement information used in generating the controlling information between the first color measurement information and the second color measurement information.

6 Claims, 7 Drawing Sheets

IMAGE-PICKUP APPARATUS AND CONTROL METHOD THEREOF

BACKGROUND OF THE INVENTION

The present invention relates to an image-pickup apparatus having an autofocus (AF) correction function in accordance with the color of an object (for example, the type of light source).

There are many cases in which image-pickup apparatuses such as single-lens reflex cameras and the like employ a focus detection method called a TTL phase difference detection method. In a TTL phase difference detection method, the light beam from an image-pickup optical system is divided into two by an optical system for phase difference detection, and two images are formed on a pair of light-receiving element lines by performing secondary image formation of these divided light beams. The defocus amount of the image-pickup optical system is then acquired by detecting the relative positional difference (phase difference) of the two images.

Generally, in an image-pickup optical system or an optical system for phase difference detection, the correction of various aberrations such as chromatic aberrations and the like is performed in the visible wavelength range from 400 nm to 650 nm centered on the d-line (587 nm). Therefore, the aberrations in the wavelength area outside of the visible wavelength range, for example, in the near-infrared wavelength range, is very rarely corrected well. In this case, since the relative ratios of the near-infrared light relative to the visible light are different in image-pickup in daylight, in a light source with a low color temperature such as tungsten lamps, and in a light source with a high color temperature such as fluorescent lamps and the like, results in which different phase differences are detected are often acquired.

On the other hand, silicon photodiodes for performing photoelectric conversion used in image-pickup elements such as CMOS sensors and the like generally have a sensitivity peak of around 800 nm, and the long wavelength side has a sensitivity of around 1,100 nm. However, in order to emphasize the color reproductivity, the sensitivity is sacrificed and light outside the aforementioned visible wavelength range is blocked by filters and the like.

Further, a photoelectric conversion element (a light-receiving element) constituting a light-receiving sensor for phase difference detection similarly has a sensitivity of around 1,100 nm. However, in consideration of performing satisfactory focus control on even low-luminance objects and irradiating near-infrared (around 700 nm) assist light on an object in a low-luminance environment, it is designed to have a sensitivity of around 100 nm more than the image-pickup optical system to include the long wavelength range.

Furthermore, the amount of chromatic aberration of an optical system changes depending on the wavelength, and the focus position also changes in accordance with this. Also, the longer the wavelength, the greater the chromatic aberration, i.e. amount of focus deviation.

Therefore, in a light-receiving sensor for phase difference detection having a maximum sensitivity in the wavelength area around 700 nm, for example, when a fluorescent lamp with a few long wavelength components is set as the light source and when a flood lamp with many long wavelength components is set as the light source, the focus positions are different even if the object distance is the same. In other words, the focus position found by the phase difference detection method must be corrected according to the type of light source (in other words, color of the object).

A method for correcting the focal point position in accordance with the type of light source (color of the object) in this manner is disclosed in Japanese Patent Laid-Open No. 2000-275512 and Japanese Patent Laid-Open No. 9-211522. The correction method disclosed in Japanese Patent Laid-Open No. 2000-275512 uses the difference in spectral sensitivity characteristics between a light-receiving sensor for phase difference detection (hereinafter referred to as an AF sensor) and a sensor for light source detection to determine the type of light source. The light source information is obtained from the output of the light source detecting sensor after the output from the AF sensor is acquired, and light source correction processing of the defocus amount is performed based on the light source information.

Further, in the correction method disclosed in Japanese Patent Laid-Open No. 9-211522, when image-pickup of the second image or beyond is performed in continuous image-pickup (continuous image-pickup), the light source correction processing of the defocus amount is performed based on the light source information detected in the image-pickup preparation operation of the first image.

However, as in the correction method disclosed in Japanese Patent Laid-Open No. 2000-275512, when the light source information is found from the output of the light source detecting sensor after the output from the AF sensor is acquired, if the acquisition of the light source information is delayed, the AF processing (focus control) is delayed. Therefore, the timing of the image-pickup operation for acquiring the image for recording is also delayed. More particularly, a delay in the acquisition of the light source information when performing continuous image-pickup obstructs the improvement of the continuous image-pickup speed.

On the other hand, as in the correction method disclosed in Japanese Patent Laid-Open No. 9-211522, using the light source information A from the first image for the image-pickup for the second image or beyond as well improves the continuous image-pickup speed. However, if the color of the object changes during continuous image-pickup, the focus may deviate in the image-pickup from the second image or beyond.

BRIEF SUMMARY OF THE INVENTION

The present invention provides an image-pickup apparatus and a control method thereof which can reduce the occurrence of focus deviation due to a change in the color of an object while avoiding a delay in the AF processing due to a delay in the acquisition of information related to the color of an object.

An image-pickup apparatus as one aspect of the present invention includes a focus detecting part that detects focus information indicating a focus state of an image-pickup optical system, a color measuring part that detects color measurement information related to a color of an object, a controlling part that generates controlling information used in focus control using the focus information and the color measurement information, and a memory that stores the color measurement information. When the color measurement information stored in the memory is referred to as a first color measurement information, and color measurement information which is detected by the color measuring part after the first color measurement information is detected is referred to as a second color measurement information, the controlling part performs a determination related to a delay in the acquisition of the second color measurement information relative to the acquisition of the focus information, and, based on the determination result, switches the color measurement information used in generating the controlling information between the first color measurement information and the second color measurement information.

An method for controlling an image-pickup apparatus as another aspect of the present invention includes the steps of detecting focus information which indicates a focal state of an image-pickup optical system, detecting color measurement information related to a color of an object, generating controlling information used in focus control using the focus information and the color measurement information, and storing the color measurement information in a memory. When the color measurement information stored in the memory is referred to as a first color information measurement, and color measurement information which is detected after the first color measurement information is detected is referred to as a second color measurement information, in the step of generating the controlling information, a determination related to a delay in the acquisition of the second color measurement information relative to the acquisition of the focus information is performed, and, based on the determination result, the color measurement information used in generating the controlling information is switched between the first color measurement information and the second color measurement information.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Figure 1:
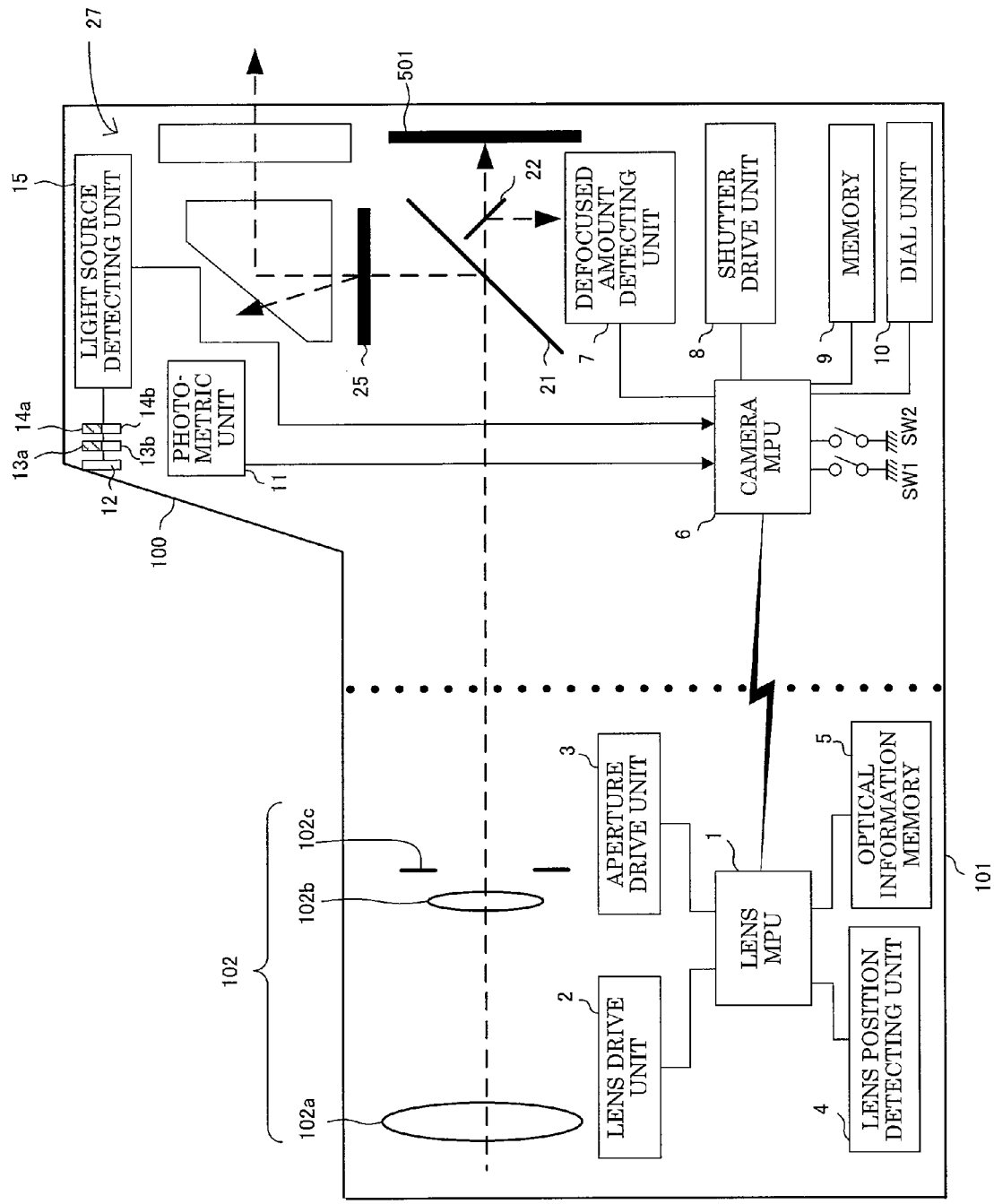
FIG. 1 is a block diagram showing the configuration of a camera and an interchangeable lens attached to the camera, which are Embodiment 1 and Embodiment 2 of the present invention.

In FIG. 1, the configuration of a lens exchange-type single-lens reflex digital camera as the image-pickup apparatus which is Embodiment 1 of the present invention is shown.

In FIG. 1, reference numeral 101 denotes an interchangeable lens, and reference numeral 100 denotes a single-lens reflex digital camera in which the interchangeable lens 101 is detachably mounted.

The interchangeable lens 101 is connected to the camera 100 via a mount shown by the dotted line in the diagram. In the interchangeable lens 101, reference numeral 1 denotes a lens MPU (hereinafter referred to as the lens microcomputer) which performs calculation and control related to the interchangeable lens 101. Reference numeral 102 denotes an image-pickup optical system configured by a plurality of lenses 102a, 102b and an aperture 102c which are arranged inside the interchangeable lens 101. Reference numeral 2 denotes a lens drive unit which moves the focus lens 102a in the image-pickup optical system 102 in accordance with a signal from the lens microcomputer 1. Reference numeral 3 denotes an aperture drive unit which drives the aperture 102c in accordance with a signal from the lens microcomputer 1.

Reference numeral 4 denotes a lens position detecting unit which detects the position of the focus lens 102a, and reference numeral 5 denotes an optical information memory which stores the optical information unique to the interchangeable lens 101 which is necessary for the autofocus (AF).

In the camera 100, reference numeral 6 denotes a camera MPU (hereinafter referred to as the camera microcomputer) which performs calculation and control related to the camera 100 and the interchangeable lens 101. The camera microcomputer 6 is capable of communicating with lens microcomputer 1 via the point of contact provided on the mount. The camera microcomputer 6 acquires the position information of the focus lens 102a from the lens microcomputer 1 and the optical information unique to the interchangeable lens 101 by communication. Further, the lens microcomputer 1 acquires controlling information (to be mentioned later) used in the focus control from the camera microcomputer 6.

Reference numeral 21 denotes a main mirror which can move in and out with respect to the optical path of the light beam from the image-pickup optical system 102 (hereinafter referred to as the image-pickup optical path). Reference numeral 22 denotes a submirror which can move in and out with the main mirror 21 with respect to the image-pickup optical path. The main mirror 21 reflects a part of the light beam from the image-pickup optical system 102 in a state arranged in the image-pickup optical path as in the illustration so as to lead it to a focusing plate 25 and a viewfinder optical system 27. At this time, the light beam transmitting through the main mirror 21 is reflected by the submirror 22 arranged behind the main mirror 21, and then led to a defocus amount detection unit 7 which is a focus detecting element.

The light beam from the image-pickup optical system 102 passes a shutter which is not illustrated and arrives at an image-pickup element 501 by withdrawing the main mirror 21 and submirror 22 to the outside of the image-pickup optical path. This enables the image-pickup of an object image formed by the light beam from the image-pickup optical system 102.

The image-pickup element 501 is a photoelectric conversion element configured by a CCD sensor or a CMOS sensor and it performs photoelectric conversion on an object image and outputs an image-pickup signal. The camera microcomputer 6 performs various image processing on the image-pickup signal to generate an image signal. The image signal is displayed on a display which is not illustrated, and recorded on a recording medium (such as a semiconductor memory or a Laser Disk) which is not illustrated.

Figure 5:
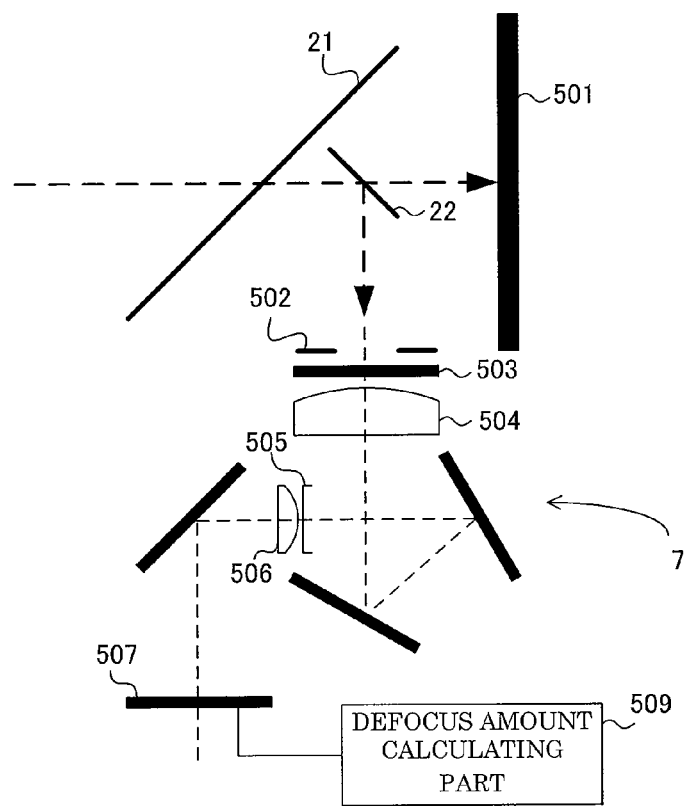
FIG. 5 is a diagram showing the configuration of the defocus amount detection unit in the camera of Embodiments 1 and 2.

As shown in FIG. 5, the defocus amount detection unit 7 has a viewing field mask 502, an infrared cut filter 503, a field lens 504, an aperture 505, a secondary image-forming lens 506 and AF sensor 507.

Figure 6:
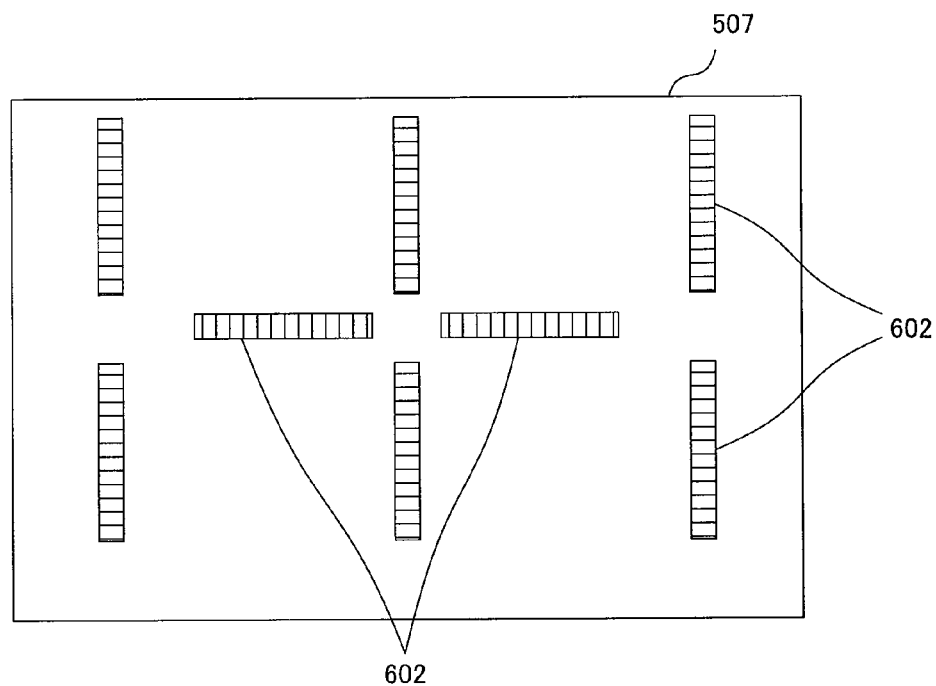
FIG. 6 is a diagram showing the configuration of the AF sensor in the camera of Embodiments 1 and 2.

The viewing field mask 502 is a light-shielding member which passes only the light beam from the area performing focus detection (focus detection area) within the image-pickup range. A plurality of pairs of line sensors 602 corresponding to a plurality of focus detection areas are mounted on the AF sensor 507 as shown in FIG. 6. The viewing field mask 502 has a plurality of light-passing apertures (cross type apertures in the center and lengthwise apertures on both sides) corresponding to these line sensors 602.

The light beam which was reflected with the submirror 22 and passed through the viewing field mask 502, the infrared cut filter 503, the field lens 504 and the aperture 505, is divided into 2 relative to each pair of line sensors 602 by the secondary image-forming lens 506. The two divided light beams form two images on one pair of line sensors 602. Then, two image signals are obtained by performing photoelectric conversion of the two images by one pair of line sensors 602.

The defocus amount detection unit 7 has a defocus amount calculating part 509 as shown in FIG. 5. The defocus amount calculating part 509 reads the 2 aforementioned image signals from the AF sensor 507 and calculates the phase difference between the two image signals using the correlation calculation method. Furthermore, the focus amount (focus information) is calculated.

The defocus amount calculating part 509 has a function to notify the camera microcomputer 6 of the completion of the charge accumulation and the completion of the reading of the image signal for each line sensor 602 included in the AF sensor 507.

In the present embodiment, the case in which the defocus amount calculating part 509 which calculates the defocus amount is provided in the defocus amount detection unit 7 will be explained. However, an image signal from the AF sensor 507 can be taken in the camera microcomputer 6 and the calculation of the phase difference and the defocus amount may be performed in the camera microcomputer 6. In this case, a focus detecting element is configured by the defocus amount detection unit 7 and the camera microcomputer 6.

The camera microcomputer 6 performs a light source correction to be mentioned later on the defocus amount, and then calculates (generates) the defocus amount which was light source corrected. Further, the camera microcomputer 6 receives the current position information of the focus lens 102a, the positional sensitivity information of the focus lens 102a, and the like acquired in the lens position sensing unit 4 from the lens microcomputer 1. The defocus amount for which light source correction has been performed and the current position information and positional sensitivity information of the focus lens 102a are used to calculate (generate) the drive amount information (controlling information used for the focus control) of the focus lens 102a for obtaining an in-focus state. The information of the drive direction of the focus lens 102a is also included in the drive amount information.

Furthermore, the camera microcomputer 6 sends the drive amount information to the lens microcomputer 1. The lens microcomputer 1 outputs a signal to the lens drive unit 2 based on the drive amount information and moves the focus lens 102a. Thereby, an in-focus state by the AF can be acquired.

In FIG. 1, reference numeral 8 denotes a shutter drive unit for driving the opening and closing of the previously mentioned shutter which is not illustrated, and 9 denotes a memory for storing the color measurement information to be mentioned later.

Reference numeral 10 denotes a dial unit as an operating part, and it is provided so that a user performs various operation settings of the camera 100. Other than the settings related to exposure control such as shutter speed and aperture value, the settings include image pick-up modes such as single image-pickup and continuous image-pickup, and a continuous image-pickup speed (target continuous image-pickup speed) in the continuous image-pickup mode. In the single image-pickup mode, one still image is picked up in accordance with one ON operation of the image-pickup switch to be mentioned later. In the continuous image-pickup mode, a plurality of still images is picked up consecutively by a continuous ON operation of the image-pickup switch.

Further, in the present embodiment, a user can arbitrarily set the target continuous image-pickup speed from a high-speed continuous image-pickup speed (for example, ten images/second) to a low-speed continuous image-pickup speed (for example, three images/second) via the dial unit 10 when the continuous image-pickup mode has been set. SW1 is an image-pickup preparation switch which turns ON in accordance with a first stroke operation (half push operation) of a release button which is not illustrated, and SW2 is an image-pickup switch which turns ON in accordance with a second stroke operation (full push operation) of the release button. In the single image-pickup mode, the camera microcomputer 6 performs AF processing and exposure control processing in accordance with the ON operation of the image-pickup preparation switch SW1, and performs shutter control and acquisition of an image for recording using the image-pickup element 501 in accordance with the ON operation of the image-pickup switch SW2. In the continuous image-pickup mode, the operation of the camera microcomputer 6 in accordance with the ON operation of the image-pickup preparation switch SW1 and the image-pickup switch SW2 will be mentioned later.

Reference numeral 11 denotes a photometry unit. The photometry unit 11 detects (generates) photometry information expressing an object luminance using the light beam transmitting through the penta prism which constitutes the viewfinder optical system, and outputs it to the camera microcomputer 6. The camera microcomputer 6 performs exposure control which determines the shutter speed and the aperture value based on the photometry information.

Reference numerals 13a and 13b denote two optical filters in which the optical characteristics (transmittance characteristics due to wavelength) differ from one another. Reference numerals 14a and 14b denote two light source detection sensors that receive two light beams transmitted through optical filters 13a and 13b, respectively (hereinafter referred to as LSD sensors). A diffusing plate 12 for diffusing light beam from an object and entering it into optical filters 13a and 13b is provided on the front surface of optical filters 13a and 13b.

Two light beams from an object with mutually differing wave length regions, for example, a visible wavelength light beam and near-infrared wavelength light beam, enter the LSD sensors 14a and 14b through optical filters 13a and 13b. In this case, a visible light sensor with sensitivity mainly in the visible wavelength range and an infrared sensor with sensitivity mainly in the near-infrared range are used as LSD sensors 14a and 14b.

The light-receiving sensor provided in the photometry unit 11 may also be simultaneously used as the visible light sensor.

Reference numeral 15 denotes a light source detection unit which detects (generates) light source information as the color measurement information related to the color of the object based on the signal read from the LSD sensors 14a and 14b. The color measuring part includes the optical filters 13a and 13b, the LSD sensors 14a and 14b, and the light source detection unit 15. The color (color temperature) of the object mainly changes depending on the type of light source lighting up the object. Thus, the light source information can be handled as information corresponding to the color of the object.

The visible wavelength range luminance information expressed by a signal from the LSD sensor (visible light sensor) 14a and the near-infrared wavelength range luminance information expressed by a signal from the LSD sensor (infrared sensor) 14b are included in the light source information.

Figure 8:
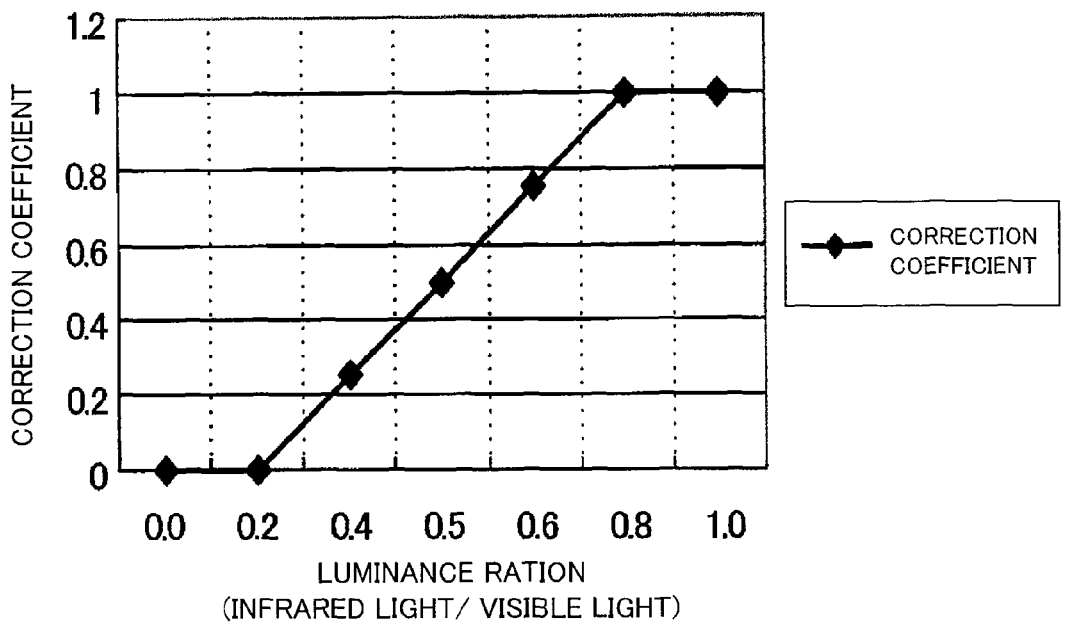
FIG. 8 is a diagram showing an example of data used in the light source correction of the defocus amount in Embodiments 1 and 2.

The camera microcomputer 6 calculates the ratio of the visible wavelength range luminance information and the near-infrared wavelength range luminance information, namely, the luminance ratio, and reads the correction coefficient from the data table shown in FIG. 8 in accordance with the luminance ratio (infrared light/visible light). This data table is stored in the memory 9.

Further, the camera microcomputer 6 receives the chromatic aberration data of the image-pickup optical system 102 which has been stored in the optical information memory 5 in the interchangeable lens 101 via communication at times such as when the interchangeable lens 101 is attached to camera 100.

The camera microcomputer 6 calculates the chromatic aberration amount data for the defocus amount correction by multiplying the chromatic aberration amount data by the correction coefficient in accordance with the above described luminance ratio. Then, the chromatic aberration amount data for this defocus amount correction is added to the defocus amount acquired by the defocus amount detection unit 7 to calculate the defocus amount after light source correction (hereinafter referred to as the corrected defocus amount).

A plurality of light-receiving element lines (LSD light-receiving element lines) is provided on the LSD sensors 14a and 14b. The light source detection unit 15 has a function to notify the camera microcomputer 6 of the completion of the charge accumulation and the completion of the signal reading for each LSD light-receiving element line.

Figure 2:
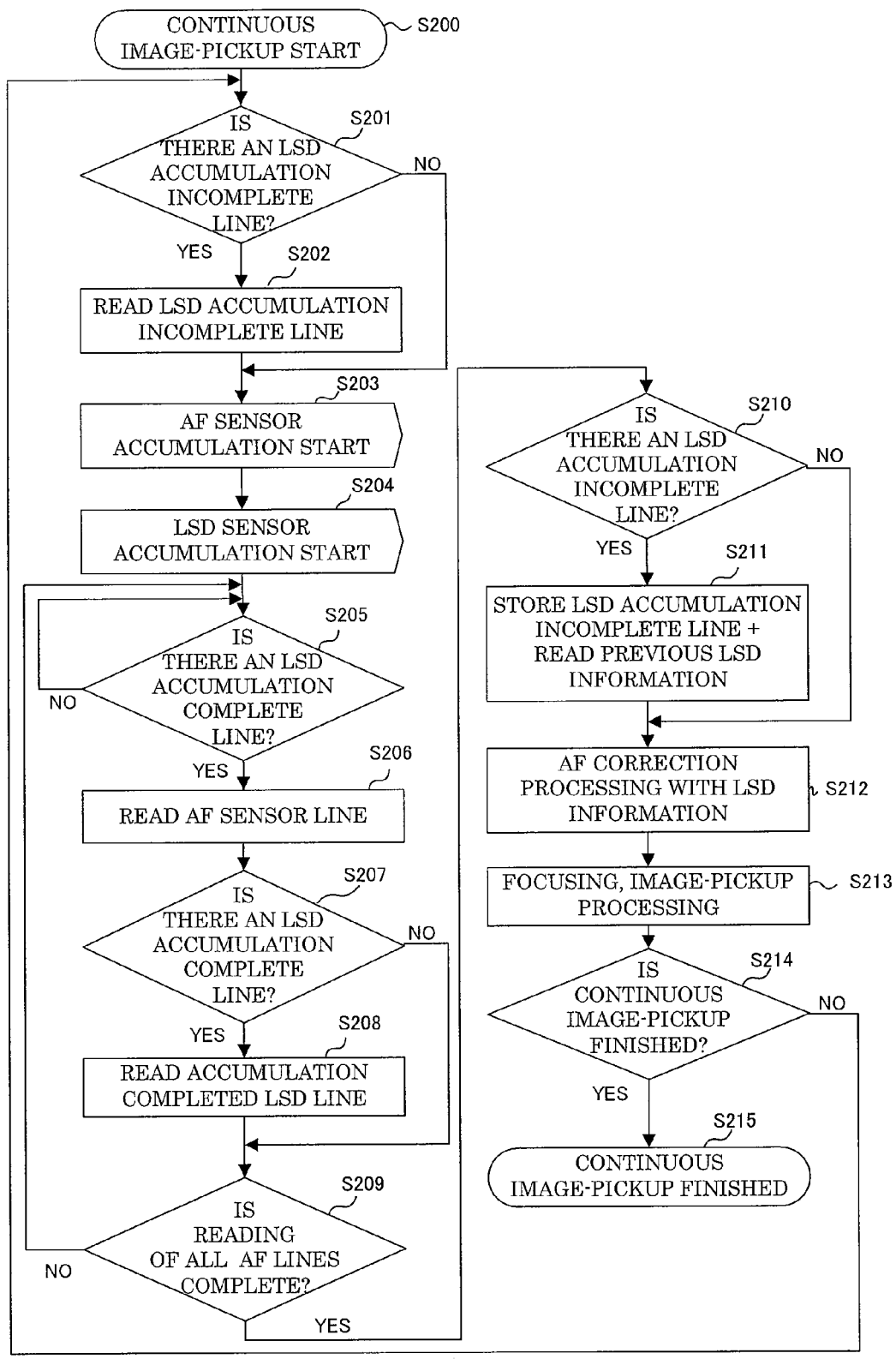
FIG. 2 is a flow chart showing the operation of the camera of Embodiment 1.
Figure 7:
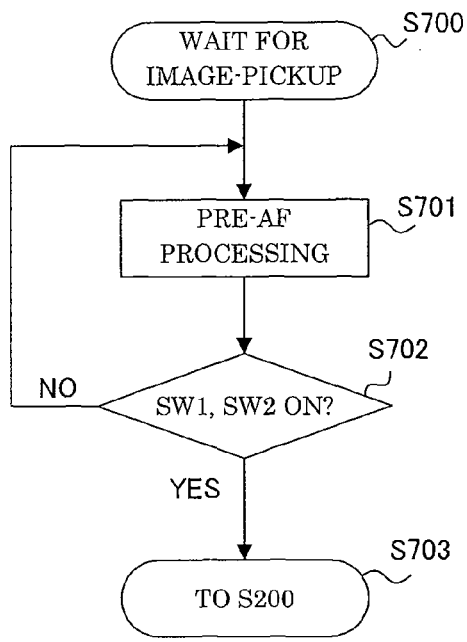
FIG. 7 is a flow chart showing the operation of the camera of Embodiments 1 and 2.

Next, the flow charts of FIG. 2 and FIG. 7 will be used to explain the operation of the camera microcomputer 6 in the present embodiment including the processing of the focus position correction (light source correction) based on the light source information. Here, the operation (image-pickup routine) of the camera microcomputer 6 when the continuous image-pickup mode has been set will be explained. This operation is performed according to a computer program stored in the ROM of the camera microcomputer 6. This is the same in the other embodiment to be mentioned later.

After starting up the camera 100, the camera microcomputer 6 enters an image-pickup waiting state in step 700 (shown by an S in the diagrams) of FIG. 7. Pre-AF processing is performed in step 701 in this waiting state. In the pre-AF processing, the charge accumulation and the reading of the charge (signal) with the LSD sensors 14a and 14b and AF sensor 507 are carried out.

Then, in step 702, the camera microcomputer 6 determines whether or not the image-pickup preparation switch SW1 and the image-pickup switch SW2 have been turned ON. If the switches have been turned ON, the processing advances to step 703, and if they have not been turned ON, the processing returns to step 701. In step 703, the camera microcomputer 6 determines whether or not the continuous image-pickup mode has been set, and the processing advances to step 200 in FIG. 2 if the continuous image-pickup mode has been set.

If the camera microcomputer 6 enters the continuous image-pickup mode in step 200, the processing advances to step 201. In step 201, the camera microcomputer 6 checks for the presence or absence of an LSD light-receiving element line in which signal reading by light source detection unit 15 among LSD sensors 14a and 14b is incomplete (hereinafter referred to as an LSD incomplete accumulation line) For the first (first image) image-pickup in the continuous image-pickup, the LSD incomplete accumulation line check is performed during pre-AF processing. If there is no LSD incomplete accumulation line, the processing advances to step 203. If there is an LSD incomplete accumulation line, the processing advances to step 202, and the camera microcomputer 6 performs signal reading processing from the LSD incomplete accumulation line. The LSD incomplete accumulation line is reset after this.

Next, in step 203, the camera microcomputer 6 starts the charge accumulation in the AF sensor 507 (line sensor 602) in the defocus amount detection unit 7.

Further, in step 204, the camera microcomputer 6 starts the charge accumulation in the LSD sensors 14a and 14b which are connected to the light source detection unit 15.

Next, in step 205, the camera microcomputer 6 determines whether or not a charge accumulation completion notice of any of the line sensors has been received from the defocus amount detection unit 7. In step 206, if the charge accumulation completion notice has been received, the signal reading from the line sensor in which the charge accumulation has been completed is performed in the defocus amount detection unit 7.

Next, in step 207, the camera microcomputer 6 checks for the presence or absence of an LSD light-receiving element line in which the charge accumulation in the LSD sensors 14a and 14b has been newly completed (hereinafter referred to as the LSD complete accumulation line). If there is a LSD complete accumulation line, the process advances to step 208, and signal reading from the LSD complete accumulation line is performed in the light source detection unit 15.

In step 209, the camera microcomputer 6 checks whether or not signal reading from all line sensors 602 in the AF sensor 507 have been completed. If it is not completed, the processing returns to step 205, and if it is completed, in other words, when the defocus amount was able to be acquired as the focus information, the process advances to step 210.

In step 210, the camera microcomputer 6 checks whether or not there is an LSD incomplete accumulation line in which the charge accumulation in the LSD sensors 14a and 14b has not yet been completed.

If there is an LSD incomplete accumulation line, in other words, a case in which the light source information (the second color measurement information) is not yet acquired when the defocus amount as the focus information is acquired in the current image-pickup routine, the process advances to step 211. In step 211, the camera microcomputer 6 stores the LSD incomplete accumulation line in the memory 9. Further, in this case, when the current image-pickup routine is the second image-pickup routine (second image) or beyond in the continuous image-pickup mode, the camera microcomputer 6 reads the light source information (the first color measurement information) which was acquired in the previous image-pickup routine and recorded in the memory 9 from the memory 9. In the diagrams, the light source information is referred to as LSD information. Then, the processing advances to step 212.

Here, it is preferable for "the previous image-pickup routine" to be the image-pickup routine directly preceding the current image-pickup routine. However, it may also be an image-pickup routine preceding the image-pickup routine directly preceding the current routine.

In step 210, if there is no LSD incomplete accumulation line, in other words, in a case in which the light source information (the second color measurement information) has been acquired when the defocus amount is acquired in the current image-pickup routine, the operation of the LSD sensors 14a and 14b is stopped. Then, the processing advances to step 212. The light source information that is the second color measurement information is the color measurement information acquired (newly) after the light source information as the first color measurement information stored in memory 9 is acquired.

In step 212, the camera microcomputer 6 performs the processing of the light source correction on the previously mentioned defocus amount based on the light source information (the second color measurement information) which has been acquired by step 210 or the light source information (the first color measurement information) which is read in step 211 from memory 9. If light source information which has been acquired by step 210 exists, the light source correction is performed using this light source information, and if such light source information does not exist, the light source correction is performed using the light source information read from memory 9. In this way, the corrected defocus amount is calculated.

Next, the camera microcomputer 6 performs the focus processing in step 213. Specifically, the drive amount information of the focus lens 102a is calculated based on the corrected defocus amount, and the drive amount information is sent to the lens microcomputer 1. Thereby, the focus lens 102a is driven to the focusing position, and an in-focus state is obtained. Furthermore, the camera microcomputer 6 performs image-pickup processing of the image for recording.

Next, in step 214, the camera microcomputer 6 determines whether or not the continuous image-pickup has finished, and returns to step 201 if it is not finished. If the continuous image-pickup has finished, the operation of this flow finishes at step 215.

As explained above, in the present embodiment, in the continuous image-pickup mode, a determination of whether or not new light source information has been acquired when the defocus amount is acquired is performed as a determination related to a delay in the acquisition of the light source information relative to the acquisition of the defocus amount. The light source information used for light source correction of the defocus amount during continuous image-pickup is switched in accordance with the determination result. Specifically, if new light source information has been acquired when the defocus amount is acquired from the defocus amount detection unit 7, the new light source information is used. On the other hand, if new light source information has not been acquired when the defocus amount is acquired from the defocus amount detection unit 7, the light source information previously acquired and stored in the memory 9 is used.

By switching the light source information used for the light source correction (in other words, generating the controlling information) of such a defocus amount, the light source correction of the defocus amount and the focus control (focus processing) can be performed without waiting for the acquisition of new light source information after the acquisition of the defocus amount. Therefore, a decline in the continuous image-pickup speed caused by waiting for the acquisition of the new light source information can be avoided. In other words, the continuous image-pickup speed can be improved.

Further, in each image-pickup routine during continuous image-pickup, as long as the acquisition of new light source information is on time relative to the acquisition of the defocus amount, the new light source information is used to perform the light source correction. Therefore, even if the type of light source lighting up the object during continuous image-pickup changes and the color of the object changes, the occurrence of defocusing can be reduced.

Embodiment 2

Figure 3A:
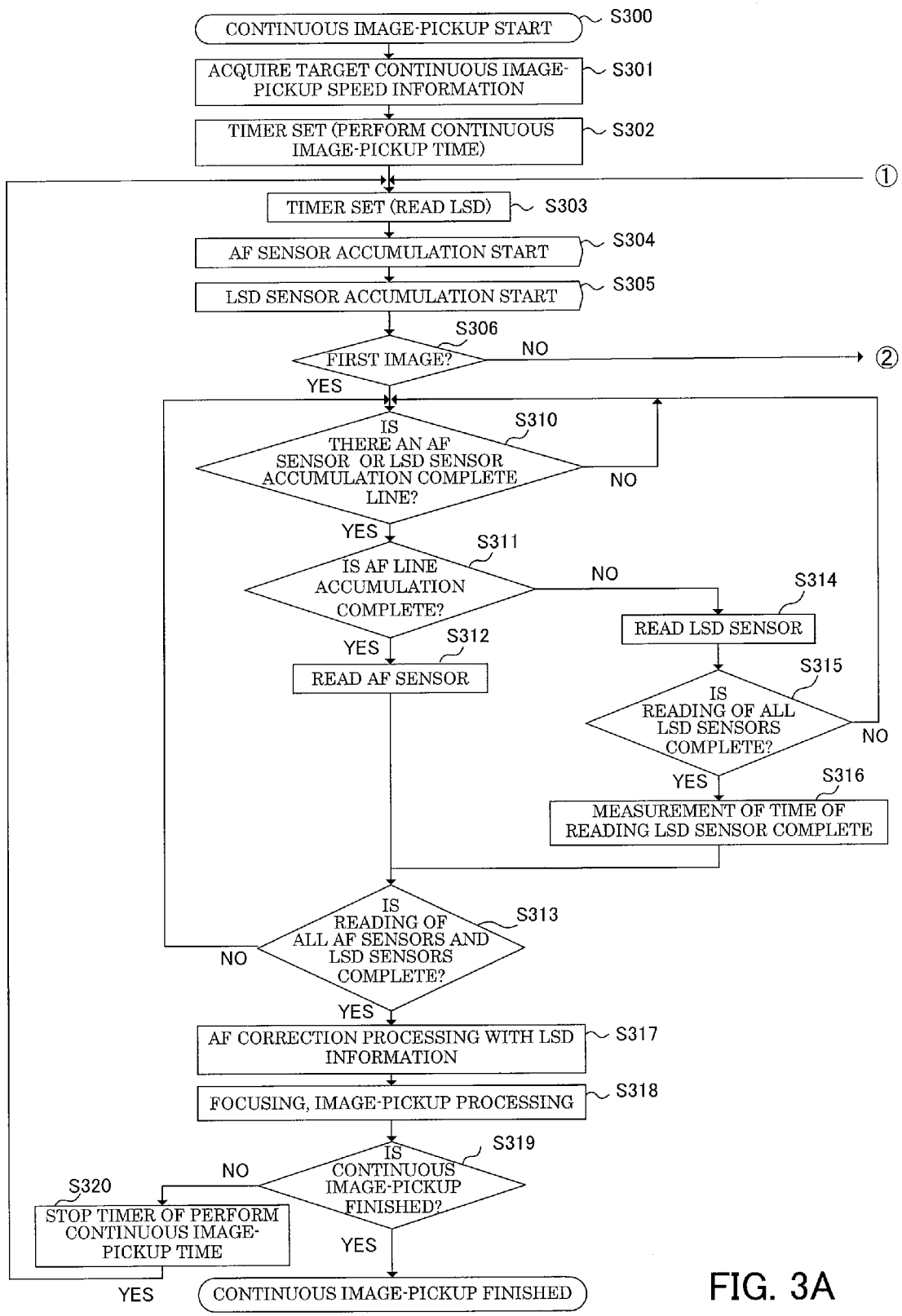
FIG. 3A and FIG. 3B are flow charts showing the operation of the camera which is Embodiment 2.
Figure 3B:
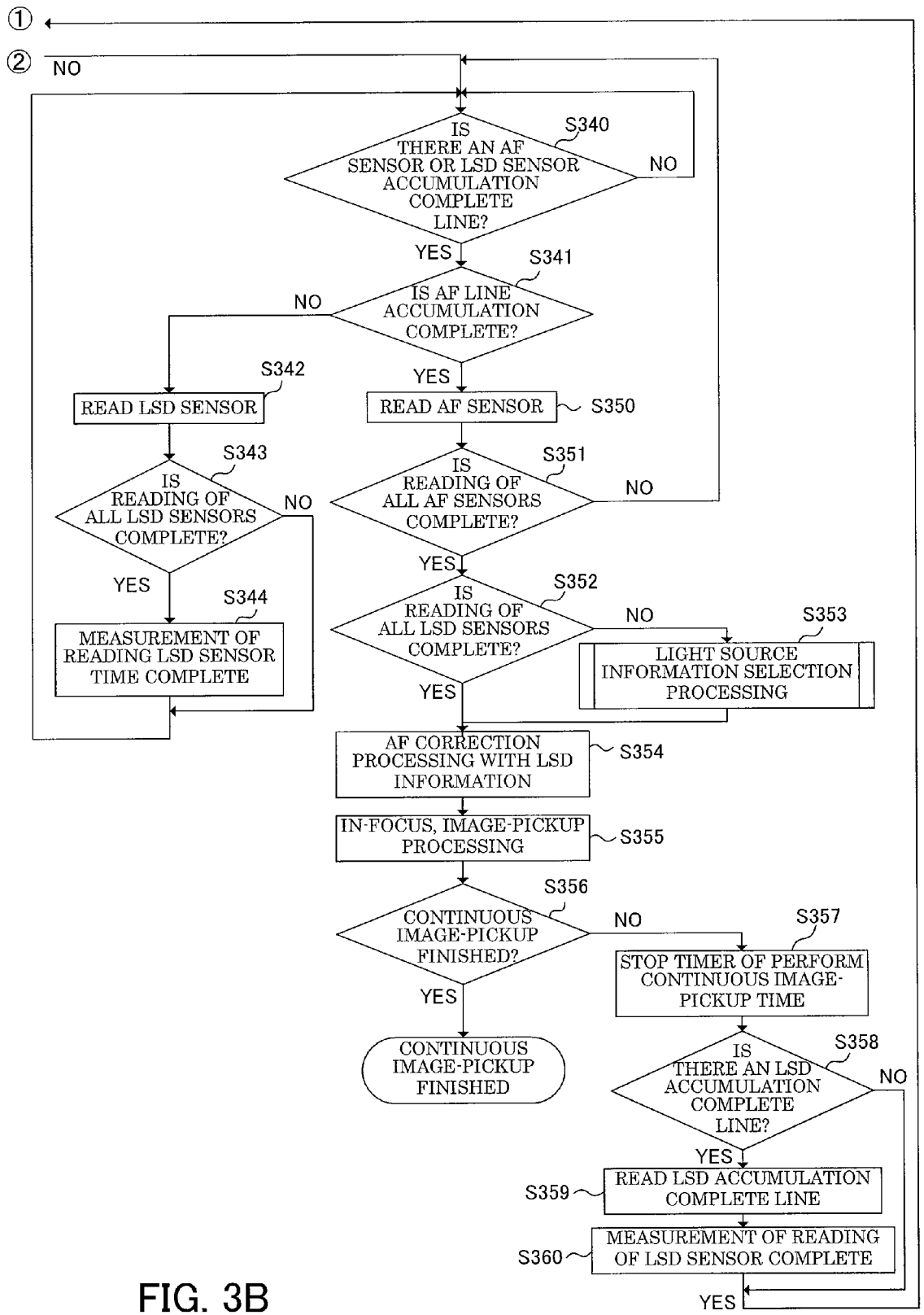

In the flow charts of FIG. 3A and FIG. 3B, the operation (image-pickup routine) of the camera which is Embodiment 2 of the present invention is shown. In these diagrams, the sections using the same circled numbers indicate that they are connected to each other. Further, the operation of the present embodiment is performed with the camera 100 which was explained in Embodiment 1. Therefore, in the description of the present embodiment, the components identical to those of Embodiment 1 are shown with the same reference numerals used in Embodiment 1. Furthermore, the operation of the present embodiment is also performed in a continuous image-pickup mode.

When the camera microcomputer 6 passes through the processing of steps 700-703 shown in FIG. 7 and enters the continuous image-pickup mode in step 300, it advances to step 301 and acquires the information of the target continuous image-pickup speed. As explained in embodiment 1, this target continuous image-pickup speed is the continuous image-pickup speed between a high-speed continuous image-pickup speed (for example, ten images/second) to a low-speed continuous image-pickup speed (for example, three images/second) which a user arbitrarily sets via the dial unit 10.

Next, in step 302, the camera microcomputer 6 sets (starts) a timer for measuring the continuous image-pickup executing time. The continuous image-pickup executing time (time period) will be mentioned later.

Next, in step 303, the camera microcomputer 6 sets (starts) a timer for measuring the LSD sensor read time (time period). The LSD sensor read time (time period) will be mentioned later.

Next, in step 304, the camera microcomputer 6 starts the charge accumulation in the AF sensor 507 (line sensor 602) included in the defocus amount detection unit 7.

Next, in step 305, the camera microcomputer 6 starts the charge accumulation in the LSD sensors 14a and 14b.

Then, in step 306, the camera microcomputer 6 determines whether or not the current image-pickup routine is the image-pickup routine of the first image in the continuous image-pickup. If it is the image-pickup routine of the first image, then the processing advances to step 310.

In step 310, the camera microcomputer 6 determines whether or not the charge accumulation completion notice of either of the lines (in other words, line sensor 602 or an LSD light-receiving element line) among the AF sensor 507 (line sensor 602) and LSD sensors 14a and 14b has been received. If a charge accumulation completion notice has not been received, the processing of step 310 is repeated, and if it has been received, the processing advances to step 311.

In step 311, the camera microcomputer 6 determines whether or not the charge accumulation completion notice received in step 310 is from line sensor 602 (whether it is from LSD sensors 14a and 14b). If it is the charge accumulation completion notice of line sensor 602, the processing advances to step 312, and if it is the charge accumulation completion notice of LSD sensors 14a and 14b, the processing advances to step 314.

In step 312, the camera microcomputer 6 performs the signal reading from the line sensor 602 receiving the charge accumulation completion notice in the defocus amount detection unit 7. Then, the processing advances to step 313.

On the other hand, in step 314, the camera microcomputer 6 performs the signal reading from LSD sensors 14a and 14b (LSD light-receiving element lines) receiving the charge accumulation completion notice in the light source detection unit 15. Then, the processing advances to step 315.

In step 315, the camera microcomputer 6 checks whether or not the signal reading from all LSD light-receiving element lines has been completed. If has not been completed, the processing of step 310 is carried out again.

If the signal reading from all LSD light-receiving element lines has been completed, the processing advances to step 316, and the measurement of the LSD sensor read time (time period) by the timer set in step 303 is completed. The LSD sensor read time (time period) is from the start of the charge accumulation of the LSD sensors 14a and 14b in step 305 to the completion of the signal reading; in other words, it is equivalent to the time needed until the light source information is acquired. The camera microcomputer 6 stores the LSD sensor reading time in the memory 9. Then, the processing advances to step 313.

In step 313, the camera microcomputer 6 checks whether or not the signal reading from all lines of the AF sensor 507 and the LSD sensors 14a and 14b has been completed. If the signal reading has not been completed, the processing of step 310 is carried out again, and if the signal reading has been completed, the processing advances to step 317.

In step 317, the camera microcomputer 6 uses the light source information acquired up to step 313 to perform the light source correction of the defocus amount and calculate the corrected defocus amount. The method for the light source correction of the defocus amount is the same as the method explained using FIG. 8 in Embodiment 1.

Then, in step 318, the camera microcomputer 6 calculates the drive amount information of the focus lens 102a from the corrected defocus amount, then sends the drive amount information to the lens microcomputer 1 and moves focus lens 102a to the focusing position. Furthermore, the camera microcomputer 6 performs image-pickup processing of the image for recording.

Next, in step 319, the camera microcomputer 6 determines whether or not the continuous image-pickup has finished, and advances to step 320 if it is not finished. If the continuous image-pickup has finished, the operation of this flow finishes.

In step 320, the camera microcomputer 6 stops the timer count of the continuous image-pickup executing time measured from step 302. The continuous image-pickup executing time is equivalent to the time actually needed for the processing from step 302 to step 320 (until the image-pickup of one image is finished). The camera microcomputer 6 stores the timer count value of the continuous image-pickup executing time in the memory 9. Afterwards, it resets the timer and starts it again.

On the other hand, in step 306, if the current image-pickup routine has been determined to be the second image or beyond in the continuous image-pickup, the processing advances to step 340.

In step 340, the camera microcomputer 6 determines whether or not the charge accumulation completion notice of either of the lines (in other words, line sensor 602 or an LSD light-receiving element line) among the AF sensor 507 (line sensor 602) and the LSD sensors 14a and 14b has been received. If the charge accumulation completion notice has not been received, the processing of step 340 is repeated, and if it has been received, the processing advances to step 341.

In step 341, the camera microcomputer 6 determines whether or not the charge accumulation completion notice received in step 340 is from the line sensor 602 (whether it is from the LSD sensors 14a and 14b). If it is the charge accumulation completion notice of the line sensor 602, the processing advances to step 350, and if it is the charge accumulation completion notice of the LSD sensors 14a and 14b, the process advances to step 342.

In step 342, the camera microcomputer 6 performs the signal reading from the LSD sensors 14a and 14b (LSD light-receiving element lines) receiving the charge accumulation completion notice in the light source detection unit 15. Then, the processing advances to step 343.

In step 343, the camera microcomputer 6 checks whether or not the signal reading from all LSD light-receiving element lines has been completed; in other words, it checks whether or not new light source information in the current image-pickup routine has been acquired. If the signal reading has not been completed, the process returns to step 340. If the signal reading from all LSD light-receiving element lines has been completed (if the light source information has been acquired), the process advances to step 344.

In step 344, the camera microcomputer 6 completes the measurement of the LSD sensor read time (time period) by the timer set in step 303 and stores the LSD sensor read time (time period) in the memory 9. Then, the processing returns to step 340.

On the other hand, in step 350, the camera microcomputer 6 performs the signal reading from line sensor 602 receiving the charge accumulation completion notice in the defocus amount detection unit 7. Then, the processing advances to step 351.

In step 351, the camera microcomputer 6 checks whether or not the signal reading from all line sensors 602 in the AF sensor 507 has been completed. If it has not been completed, the processing returns to step 340. If it has been completed, then the processing advances to step 352.

Figure 4:
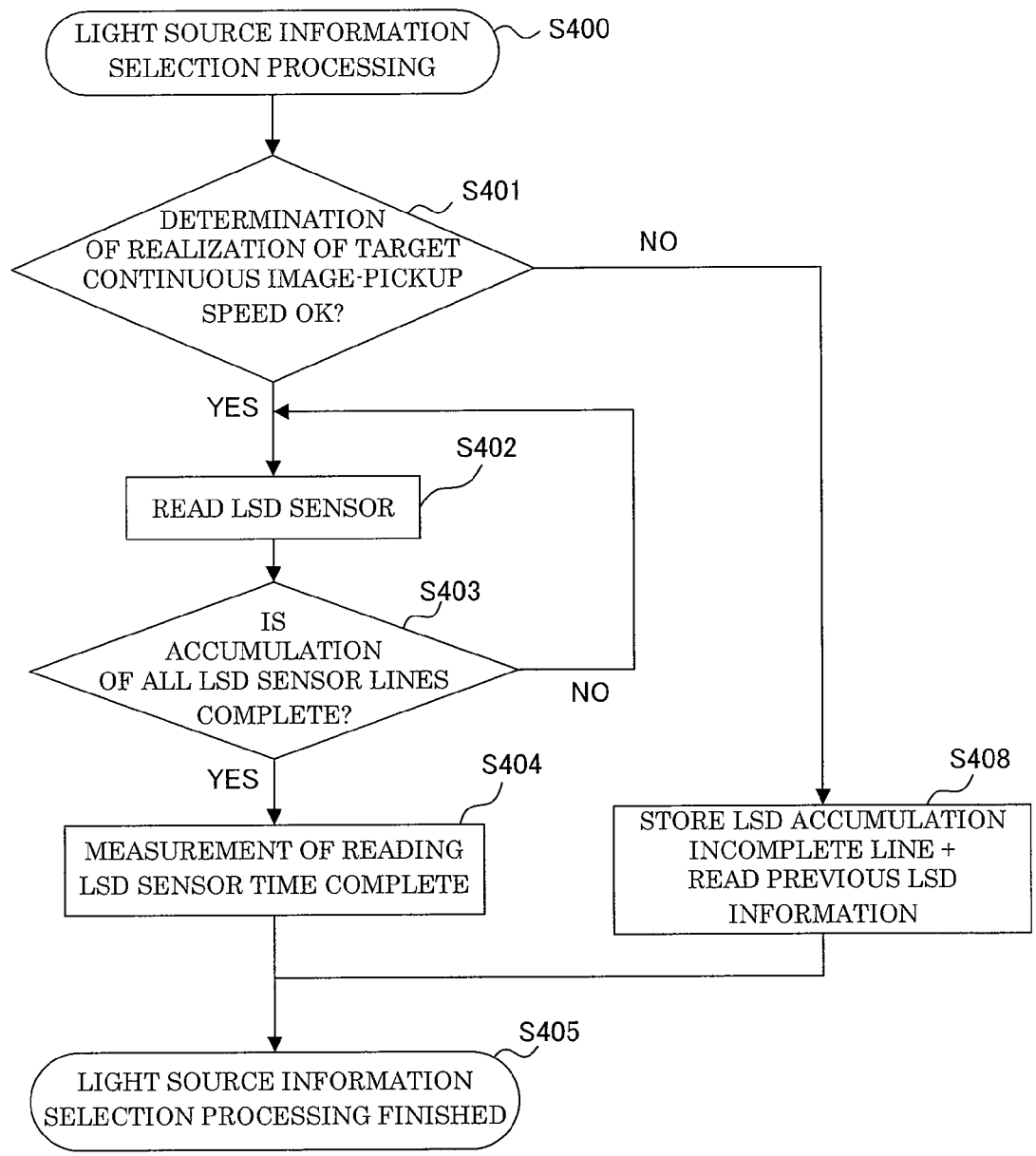
FIG. 4 is a flow chart which explains the light source information selection processing in the camera of Embodiment 2.

In step 352, the camera microcomputer 6 checks whether or not the signal reading from all LSD light-receiving element lines has been completed; in other words, it checks whether or not new light source information in the current image-pickup routine has been acquired. If the signal reading has not been completed (if the light source information has not been acquired), the processing advances to step 353, and the light source information selection processing shown in FIG. 4 is performed.

If the light source information selection processing is started in step 400, the camera microcomputer 6 advances to step 401. In step 401, the camera microcomputer 6 checks whether or not the target continuous image-pickup speed can be realized even if the focus processing has been performed after waiting for the acquisition of the light source information from the light source detection unit 15 (LSD sensors 14a and 14b). In other words, if the light source information as the second color measurement information has not been acquired when the defocus amount is acquired, the camera microcomputer 6 performs a determination, related to a delay in the acquisition of the light source information relative to acquisition of the defocus amount, of whether or not the light source information can be acquired within a predetermined time in accordance with the target continuous image-pickup speed.

The determination related to this delay is performed as described below, for example. First, the LSD sensor read time (time period) measured in the previous image-pickup routine and stored in the memory 9 is subtracted from the continuous image-pickup executing time measured in the previous image-pickup routine and stored in the memory 9. Thereby, the focusing image-pickup processing time needed from the completion of the acquisition of the light source information to the completion of the focusing and image-pickup processing in the previous image-pickup routine is calculated. Here, it is preferable for "the previous image-pickup routine" to be the image-pickup routine directly preceding the current image-pickup routine. However, it may also be an image-pickup routine preceding the image-pickup routine directly preceding the current routine. Further, the LSD sensor read time (time period) may be a time for which measurement was completed in any of steps 316 and 344 or steps 402 and 360A to be mentioned later.

Furthermore, the image-pickup routine permissible time, which is the time which can be spent for one image-pickup routine (step 303 to step 355) during continuous image-pickup, is calculated from the target continuous image-pickup speed set for this continuous image-pickup mode by a user. Next, the previously mentioned focusing image-pickup processing time is subtracted from the image-pickup routine permissible time. Thereby, the LSD sensor read permissible time, which is the time permissible as the LSD sensor read time (time period) in one image-pickup routine, is calculated. The LSD sensor read permissible time mentioned here is equivalent to the predetermined time in accordance with the target continuous image-pickup speed.

If the LSD sensor read time (time period) measured in the previous image-pickup routine is within the LSD sensor read permissible time, it is predicted that the target continuous image-pickup speed can be realized even if the focus processing has been performed after waiting for the acquisition of the light source information in the current image-pickup routine. In this case, the processing advances to step 402. Conversely, if the LSD sensor read time (time period) measured in the previous image-pickup routine is longer than the LSD sensor read permissible time, it is predicted that, if the focus processing is performed after waiting for the acquisition of the light source information in the current image-pickup routine, the target continuous image-pickup speed will not be able to be realized. In this case, the processing advances to step 408.

The determination method related to the delay shown here is an example, and other determination methods (other predetermined times) may be used.

In step 402, the camera microcomputer 6 performs the signal reading from LSD sensors 14a and 14b (LSD light-receiving element lines) receiving the charge accumulation completion notice in the light source detection unit 15. Then, the processing advances to step 403.

In step 403, the camera microcomputer 6 checks whether or not the signal reading from all LSD light-receiving element lines has been completed (whether or not new light source information in the current image-pickup routine has been acquired). If the signal reading has not been completed, the processing of step 402 is repeated. If the signal reading from all LSD light-receiving element lines has been completed, the processing advances to step 404.

In step 404, the camera microcomputer 6 completes the measurement of the LSD sensor read time by the timer set in step 303 and stores the LSD sensor read time in the memory 9. Then, the processing advances to step 405, and the light source information selection processing finishes (advances to step 354 of FIG. 3B).

On the other hand, in step 408, the camera microcomputer 6 stores the LSD incomplete accumulation line in the memory 9. Further, the camera microcomputer 6 reads the light source information (the first color measurement information) which was acquired in the previous image-pickup routine and stored in the memory 9 from the memory 9. Here, it is preferable for "the previous image-pickup routine" to be the image-pickup routine directly preceding the current image-pickup routine. However, it may also be an image-pickup routine preceding the image-pickup routine directly preceding the current routine. Then, the processing advances to step 405, and the light source information selection processing finishes (advances to step 354 of FIG. 3B).

In step 354, the camera microcomputer 6 performs the processing of the light source correction on the defocus amount based on the new light source information (the second color measurement information) acquired in the current image-pickup routine (steps 342 and 402) or the light source information which was read from the memory 9 in step 408. If there is new light source information, processing of the light source correction is performed based on the new light source information, and if there is no new light source information, the light source correction is performed based on the light source information read from the memory 9. In this way, the corrected defocus amount is calculated, and the processing advances to step 355.

Next, the camera microcomputer 6 performs the focus processing in step 355. In other words, the drive amount information of the focus lens 102a is calculated based on the corrected defocus amount, and the drive amount information is sent to the lens microcomputer 1. Thereby, the focus lens 102a is driven to the focusing position, and an in-focus state is obtained. Furthermore, the camera microcomputer 6 performs image-pickup processing of the image for recording.

Next, in step 356, the camera microcomputer 6 determines whether or not the continuous image-pickup has finished, and advances to step 357 if it has not finished. If the continuous image-pickup has finished, the operation of this flow finishes.

In step 357, the camera microcomputer 6 stops the timer count of the continuous image-pickup executing time measured from step 302. Then, the camera microcomputer 6 stores the timer count value of the continuous image-pickup executing time in the memory 9. Afterwards, it resets the timer and starts it again.

Next, in step 358, the camera microcomputer 6 checks for the presence or absence of an LSD incomplete accumulation line in the LSD sensors 14a and 14b. If there is no LSD incomplete accumulation line, the processing advances to step 303. If there is an LSD incomplete accumulation line, the processing advances to step 359, and the camera microcomputer 6 performs reading processing of the signal from the LSD incomplete accumulation line. The LSD incomplete accumulation line is reset in this manner. Then, the processing advances to step 360.

In step 360, the camera microcomputer 6 completes the measurement of the LSD sensor read time by the timer set in step 303. The camera microcomputer 6 stores the LSD sensor reading time in the memory 9. Then, the processing returns to step 303.

In the present embodiment, the LSD sensor read time (time period) A measured in the image-pickup sequence of the first image of the continuous image-pickup was used for the light source information selection processing in the image-pickup sequence for the second image and beyond. However, the LSD sensor read time (time period) acquired during pre-AF processing in step 701 may be measured and the light source information selection processing from the image-pickup sequence of the first image may be performed using this measurement result.

As explained above, in the present embodiment, in the continuous image-pickup mode, the determination of whether or not new light source information has been acquired when the defocus amount is acquired is performed as a first determination related to a delay in the acquisition of the light source information relative to the acquisition of the defocus amount. Furthermore, if new light source information has not been acquired when the defocus amount is acquired, a determination of whether or not new light source information can be acquired within a predetermined time is performed as a second determination related to a delay in the acquisition of the light source information relative to the acquisition of the defocus amount. The light source information used for the light source correction of the defocus amount during continuous image-pickup is switched in accordance with these determination results.

Specifically, if new light source information has been acquired when the defocus amount is acquired from the defocus amount detection unit 7, the new light source information is used. Furthermore, in the case that new light source information has not been acquired when the defocus amount is acquired, if new light source information can be acquired within the predetermined time, the new light source information is used after waiting for it to be acquired. On the other hand, if new light source information cannot be acquired within the predetermined time, the light source information acquired beforehand and stored in the memory 9 is used.

By switching the light source information used for the light source correction (in other words, generating the controlling information) of such a defocus amount, the light source correction of the defocus amount and the focus control (AF processing) can be performed without waiting for a long time for the acquisition of new light source information after the acquisition of the defocus amount. Therefore, a decline in the continuous image-pickup speed caused by waiting for the acquisition of the new light source information can be avoided. In other words, the continuous image-pickup speed can be improved.

Further, in each image-pickup routine during continuous image-pickup, as long as the acquisition of new light source information relative to the acquisition of the defocus amount satisfies the target continuous image-pickup speed, the new light source information is used to perform the light source correction. Therefore, even if the type of light source lighting up the object during continuous image-pickup changes and the color of the object changes, the occurrence of defocusing can be reduced.

In the above described embodiments, the switching of the light source information used for the light source correction in the continuous image-pickup mode has been explained. However, similar switching can also be performed in single image-pickup mode. Thereby, the image-pickup waiting time of the image for recording due to the waiting for the acquisition of the light source information in the single image-pickup mode can be shortened.

Further, in the above-described embodiments, the case in which the drive amount of the focus lens 102*a* is generated as the controlling information used for the focus control was explained. However, the defocus amount after the light source correction may also be handled as the controlling information.

In the present invention, a determination related to a delay in the acquisition of the second color measurement information (for example, the most recent color measurement information) relative to the acquisition of the focus information is performed, and, in accordance with the determination result, either the first color measurement information or the second color measurement information is used. Thereby, a delay in the focus control due to the delay in the acquisition of the color measurement information can be avoided, and moreover, the occurrence of defocusing due to a change of the color of the object during the repetition of image-pickup in continuous image-pickup can be reduced.

Furthermore, the present invention is not limited to these embodiments and various variations and modifications may be made without departing from the scope of the present invention.

This application claims the benefit of Japanese Patent Application No. 2007-207398, filed on Aug. 9, 2007, which is hereby incorporated by reference herein in its entirety.

What is claimed is:

1. An image-pickup apparatus comprising:
a focus detecting part that detects focus information indicating a focus state of an image-pickup optical system;
a color measuring part that detects color measurement information related to a color of an object;
a controlling part that generates controlling information used in focus control using the focus information and the color measurement information; and
a memory that stores the color measurement information,
wherein, when the color measurement information stored in the memory is referred to as a first color measurement information, and color measurement information which is detected by the color measuring part after the first color measurement information is detected is referred to as a second color measurement information, the controlling part performs a determination related to a delay in the acquisition of the second color measurement information relative to the acquisition of the focus information, and, based on the determination result, switches the color measurement information used in generating the controlling information between the first color measurement information and the second color measurement information.

2. The image-pickup apparatus according to claim 1, wherein the determination related to the delay is a determination of whether or not the second color measurement information has been acquired when the focus information is acquired, and
if the second color measurement information has been acquired, the controlling part generates the controlling information using the focus information and the second color measurement information, and if the second color measurement information has not been acquired, the controlling part generates the controlling information using the focus information and the first color measurement information.

3. The image-pickup apparatus according to claim 1, wherein the image-pickup apparatus has a continuous image-pickup mode which performs continuous image-pickup of a plurality of still images, and
the controlling part switches the color measurement information used in generating the controlling information in the continuous image-pickup mode.

4. The image-pickup apparatus according to claim 1, wherein, if the second color measurement information has not been acquired when the focus information is acquired, the determination related to the delay is a determination of whether or not the second color measurement information can be acquired within a predetermined time, and
if the second color measurement information can be acquired within the predetermined time, the controlling part generates the controlling information using the focus information and the second color measurement information, and if the second color measurement information cannot be acquired within the predetermined time, the controlling part generates the controlling information using the focus information and the first color measurement information.

5. The image-pickup apparatus according to claim 4, wherein the image-pickup apparatus has a continuous image-pickup mode which performs continuous image-pickup of a plurality of still images, the controlling part switches the color measurement information used in generating the controlling information in the continuous image-pickup mode, and the predetermined time is a time corresponding to a target continuous image-pickup speed set for the continuous image-pickup mode.

6. A method for controlling an image-pickup apparatus comprising the steps of:

detecting focus information which indicates a focal state of an image-pickup optical system;

detecting color measurement information related to a color of an object;

generating controlling information used in focus control using the focus information and the color measurement information; and storing the color measurement information in a memory, wherein, when the color measurement information stored in the memory is referred to as a first color information measurement, and color measurement information which is detected after the first color measurement information is detected is referred to as a second color measurement information, in the step of generating the controlling information, a determination related to a delay in the acquisition of the second color measurement information relative to the acquisition of the focus information is performed, and, based on the determination result, the color measurement information used in generating the controlling information is switched between the first color measurement information and the second color measurement information.

* * * * *